Patented Aug. 21, 1951

2,565,067

UNITED STATES PATENT OFFICE 2,565,067

PROCESS FOR OBTAINING HIGHLY CONCENTRATED ALKALOID EXTRACTS FROM PAPAVER SOMNIFERUM

Walter Theodor Max Deckert, Buenos Aires, Argentina

No Drawing. Application April 5, 1949,
Serial No. 85,724

9 Claims. (Cl. 260—285)

My invention relates to improvements in processes for the recovery of alkaloids from *Papaver somniferum*.

All medicamental and narcotic substances similar to opium contain, apart from morphine, variable quantities of other alkaloids, naturally present in the poppy. These alkaloids have an appreciable influence on the activity and compatibility of opium compounds. To date such compounds were obtained by mixing each of the components in the proportions required (such as, for example, Pantopon, Laudanon, etc.) Only the opium in itself is a natural product. This opium is the milky juice of the poppy, dried to a rubber-like brownish mass. It flows from incisions made in the poppies, appearing in the form of a white sap.

So far, other processes for obtaining natural opium have found no practical application in therapeutics. Although, by suitable means of extraction, applied both to fresh poppy heads and dried ones, as well as to poppy straw, it has been found possible, according to known procedures, to obtain opium alkaloid extracts; such extracts do not possess a sufficient degree of purity to be employable as such. Through special technical processes, therefore, these extracts are elaborated into pure morphine and other pure alkaloids.

The process according to the present invention enables a mixture of alkaloids to be obtained the purity and quality of which is such that the resulting extract, without any further treatment whatsoever, can be used as a pharmaceutical compound. The extract of this air-dried compound contains from 20% to 22% of morphine and, approximately, from 16% to 18% of accessory opium alkaloids. Its concentration, therefore, is almost double that of natural opium. The alkaloids contained in this extract, as well as in the natural opium, can be separated according to known methods.

The basically important part of the process resides, accordingly, in the extraction of a new medicament which, although no pharmacological novelty, from the therapeutical point of view is superior to all other medicaments of the opiate group owing to its many applications and its compatibility, being at least equivalent with regard to its analgesic properties.

The fundamental novelty of the process lies in the manner in which the alkaloids are isolated from the dried poppy heads and straw. All other processes which, for the same purpose, have been employed to date, as opposed to the century-old purely agrarian method of obtaining opium, so far have not been able to offer any advantages important enough to affect the world market price for opiates.

In order to illustrate in what direction industrial opiate extraction has so far been guided, the following processes may be cited:

(a) Rotermel process (for further data, see Pharmazeutische Zeitung 1934, page 729). During trials made with the purpose of extracting poppy juice by simply crushing the capsules and adding alcohol or water, great losses of alkaloids were encountered. Rotermel proved how, by fermenting the crushed poppy heads in the presence of certain bacteria and fungi, the alkaloid yield was increased. His process is as follows: The crushed poppy heads are dampened with a 1% sulphuric acid solution and allowed to ferment during 24 hours in large vats, after having been sowed with bacteria, fungi and yeast. Neutralization is then accomplished with lime water and the liquid is pressure-filtered, clarified and concentrated. The dry residue thus obtained is similar to raw opium but contains only from 8% to 10% of morphine and from 2% to 4% of other alkaloids.

(b) Hoffman's process—La Roche A.G., Basle, year 1935. In accordance with this process, extraction of the poppy heads and straw is effected by water and the strongly diluted extract, by means of complicated devices, is re-extracted with a mixture of benzol and butanol, alkaloids being thus separated, especially morphine. This latter substance is eliminated from the solvent by agitating same with an aqueous acid which, subsequently, is neutralized. After adjustment to pH 9, morphine is precipitated as a free base.

(c) As third mechanical method of obtaining morphine we have the Hungarian's Kabay process. In this case, the poppy heads or straw are cut and submitted to extraction in a diluted sulfurous acid countercurrent. The very diluted solution thus obtained is concentrated by evaporation. The residue is treated as opium in order to obtain morphine, in accordance with known methods.

The main disadvantages of all these methods proposed and used to date for the extraction of poppy heads and straw, reside in the problem of extracting and accumulating. In the first of the operations mentioned, the resulting product is accompanied by a number of inert substances consisting of albuminoids, pectins, tanning substances, sugars, resins, glue and similar combinations. Furthermore, the total extraction of alkaloids, even in the countercurrent process, demands a great quantity of solvent. After their extraction, the alkaloids are in solution, but in a concentration which is hardly greater than that in which they were previously in the plant. In order to eliminate the inert substances, and enrich the alkaloid content, all the processes, in principle, follow the same road, which consists in the constantly renewed extraction of the alkaloids by employing a great number of organic solvents, together with a continuous change in the conditions under which the extraction takes place, until the desired concentration and purity has been achieved.

Hardly anybody would consider such a process as an ideal solution to the problem. Those who have worked with these methods know that accumulation does not depend only on the pH value, but on many other factors which are beyond control. It repeatedly happens in the industry, in spite of the strict observance of all the prescribed measures, that suddenly and for no apparent reason an appreciable reduction in the yield is observed. It can even happen, sometimes, that owing to changes in the extraction process, the substance sought for disappears, finally, almost altogether.

For this reason, on studying the problem once again, attention was especially directed towards:

(1) Preventing, by suitable aggregates added to the aqueous extracting means, when the poppy heads are under treatment, that the greater part of inert substances be transferred to the solution, the purpose being to obtain a clear extract which may be readily used in the steps that follow.

(2) Separating all the morphine from this extract, as well as other valuable alkaloids, through an appropriate precipitating reaction.

Both problems have been solved. The separation of the troublesome inert substances, which cause the formation of unfiltrable precipitates, was achieved by extracting the poppy heads with an aqueous copper salt solution. An alkaline molybdate, in an acid medium, is then employed to cause precipitation of the alkaloids.

In two simple stages, thus, a precipitate is obtained consisting of complex combinations of alkaloids, easily sedimentable. After the excess, alkaloid-free liquid has been removed by filtration or, preferably, centrifugation, an amorphous sludge is obtained.

For an approximately quantitative extraction of the morphine, it is sufficient that a volume of the usual type of available broken poppy heads be submitted to a thirty-minute current of five parts by volume of liquid solvent containing the copper salt. The extract thus obtained is of a dark blue-green colour and is completely clear. The pH value of the liquid solvent is 4, and it hardly varies during the process. Consequently, no difficulties are encountered in selecting the materials for the extracting apparatus.

To separate the alkaloids from the molybdate complex, a very simple way has been found. The still wet sludge obtained after centrifugation is mixed with dry bicarbonate in open receptacles or vats. In this manner, the alkaloids are set free, although an excess of bicarbonate must be present. After the carbon dioxide formation has ceased, the sludge must be dried. This drying action is best performed at room temperature. Should it be desired to accelerate drying by the application of heat, the temperature should not be allowed to pass 50° C. inasmuch as, should this temperature be exceeded, alkaloid losses occur due to resinification. A dry residue is obtained, which is later on extracted with chloroform or acetic ester. One kilogram of dry residue requires two to three litres of solvent.

Of the chloroform or acetic ester solution, three-quarter parts by volume are submitted to distillation, in order to recuperate the solvent. The residue is treated with a small excess of diluted hydrochloric acid, being evaporated to dryness in a vacuum. A dark-brown resinous hygroscopic mass is thus obtained, being a concentrate ready for use to be referred to, in future, as "Optopon." This concentrate can be transformed at any time, according to needs and by any one of the known methods, into morphine or other pure alkaloids.

The yield of "Optopon" per kilogram of poppy heads depends, naturally, on the morphine content of those capsules, being exceedingly changeable. A study of ten different samples of poppies, delivered by different firms, resulted in yields of 0.21 to 0.69%, i.e., 2.1 to 6.9 grams of "Optopon" per kilo of capsules.

Summarizing, the fundamental novelty of this process consists in:

(a) The addition of copper salt when extracting the poppy capsules (copper sulphate, for example).

(b) Precipitation of the alkaloids from the extract obtained as per (a) above, with the aid of a hydro-soluble molybdate such as, for example, ammonium molybdate.

(c) Maintaining a pH-value of 1–2 during precipitation as per (b) above, which is made possible by adding a strong acid such as, for example, nitric acid.

(d) Decomposition, by means of dry bicarbonate, of the still damp centrifugate of the alkaloid-molybdate complex, the bicarbonate in question being, for example, sodium bicarbonate.

In carrying out the foregoing process, the initial aqueous extract may be filtered or not before proceeding with the precipitation step. In using copper sulfate in the initial extraction operation a 1% solution is employed and the acetic ester employed in the later extraction operation is advantageously ethyl acetate. This final extraction may be carried out with chloroform, a chloroform-alcohol mixture or ethyl acetate.

The industrial advantages derived from this process are:

(1) Alkaloids can be extracted even from those parts of the plant which contain only very small quantities of morphine and other opium alkaloids, without thereby obtaining quantities of troublesome inert substances hindering the separation of alkaloids from the extract.

(2) Morphine, as well as other opium alkaloids, can be quantitatively extracted from the raw vegetable matter, by countercurrent, without the appearance of troublesome inert substances that hinder the following steps, in spite of which the raw vegetable matter is exhaustively extracted.

(3) Owing to the fungicide properties of copper, the copper extracts are amply protected against mildew.

(4) Due to the simple mixture of the gross unfiltrated extract with the precipitation reactant, precipitate is formed within a few hours; this precipitate settles and is easily separable, having a 50% alkaloid-metal combination content. In this manner, by means of a process which does not require labour nor motive power, an alkaloid accumulation of 250 times is achieved.

(5) The apparatus required for large-scale manufacture, is neither costly nor complicated.

(6) The consumption of chemicals, consequent upon the opportunities offered for a simple regeneration of same, can be kept down to a minimum. The quantity of molybdate thus necessary for precipitation is 90% recoverable. The process according to the present invention avoids the usual great consumption of organic solvents.

(7) The process according to the present invention can be put into practice almost without any expenditure for power, neither steam nor gas being required and but a little electricity.

The invention as described may be clearly understood and no further explanations will be required by those versed in the matter.

As the invention herein shown and specified has been described with the aid of examples which are to be considered as illustrative and in no ways as limitations upon the invention, same may be subjected to changes without thereby departing from its essential nature, as clearly defined in the following claims.

I claim:

1. A process for obtaining alkaloids from *Papaver somniferum*, comprising extracting *Papaver somniferum* with a 1% aqueous solution of copper sulfate, precipitating the alkaloids from the resulting extract by adding ammonium molybdate thereto, and carrying out the precipitating operation at a pH value of from 1 to 2 by adding acid to the extract, separating the resulting precipitate from the extract and recovering the alkaloids therefrom.

2. A process as defined by claim 1 in which nitric acid is added to the aqueous extract to maintain the pH value thereof at from 1 to 2 during the precipitation operation.

3. A process as defined by claim 2 in which the recovered precipitate is treated while damp with an excess of a bicarbonate.

4. A process as defined in claim 3 in which the recovered precipitation is treated while damp with a 10% excess of sodium bicarbonate.

5. A process as defined by claim 4 in which the precipitate after treatment with sodium bicarbonate is dried, extracting the resulting dried material with a solvent selected from the group consisting of chloroform, a chloroform-alcohol mixture, and ethyl acetate, for recovering the alkaloids, and removing the solvent from the extract containing the alkaloids.

6. A process for obtaining alkaloids from *Papaver somniferum*, comprising extracted *Papaver somniferum* with an aqueous solution of a copper salt of about 1% concentration to recover the alkaloids in the resulting extract, and precipitating the alkaloids from the extract by adding thereto a hydrosoluble molybdate, and recovering the alkaloids from the precipitate.

7. A process as claimed in claim 6, in which the extract is maintained at a pH value of from 1 to 2 during the precipitating operation.

8. A process as claimed in claim 6, in which the precipitation of the alkaloids in the extract is effected by treating the extract with ammonium molybdate.

9. A process for the production of highly concentrated starting materials for the preparation of opium alkaloids from *Papaver somniferum*, comprising extracting the *Papaver somniferum* with an aqueous solution of a copper salt of about 1% concentration to recover the alkaloids in the resulting aqueous extract, precipitating the alkaloids from the aqueous extracts by adding thereto a hydrosoluble molybdate while maintaining the extract at a pH value of from 1 to 2, and recovering the alkaloids from the precipitate.

WALTER THEODOR MAX DECKERT.

REFERENCES CITED

The following references are of record in the file of this patent:

UNITED STATES PATENTS

| Number | Name | Date |
| --- | --- | --- |
| 1,447,400 | Stoll | Mar. 6, 1923 |